Feb. 28, 1967  C. K. STILLWAGON  3,306,316
DISC VALVE AND FITTING
Filed July 20, 1964  3 Sheets-Sheet 2
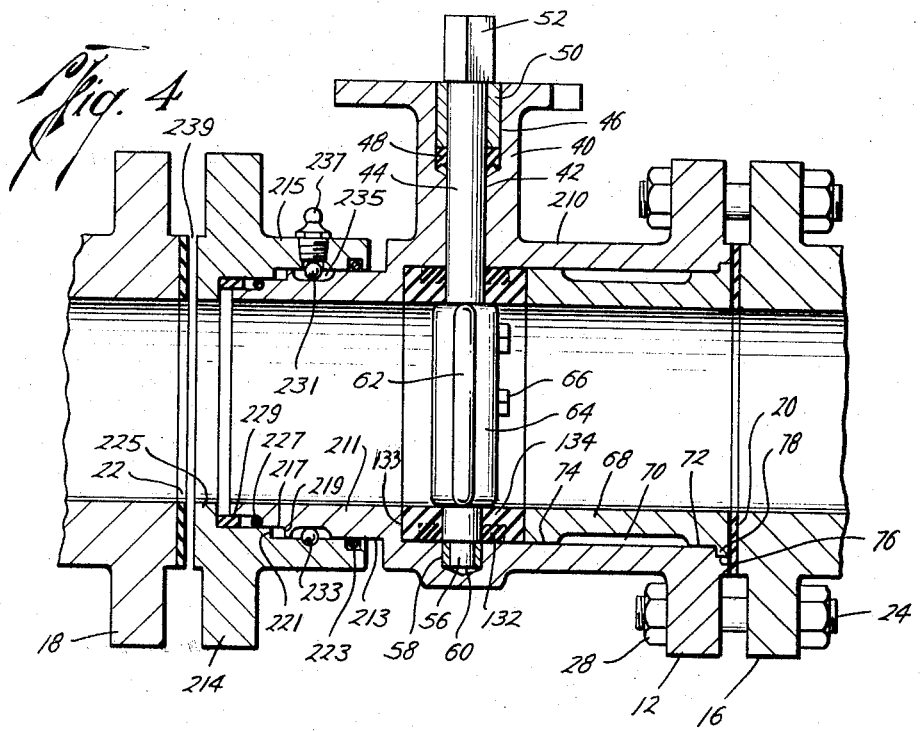
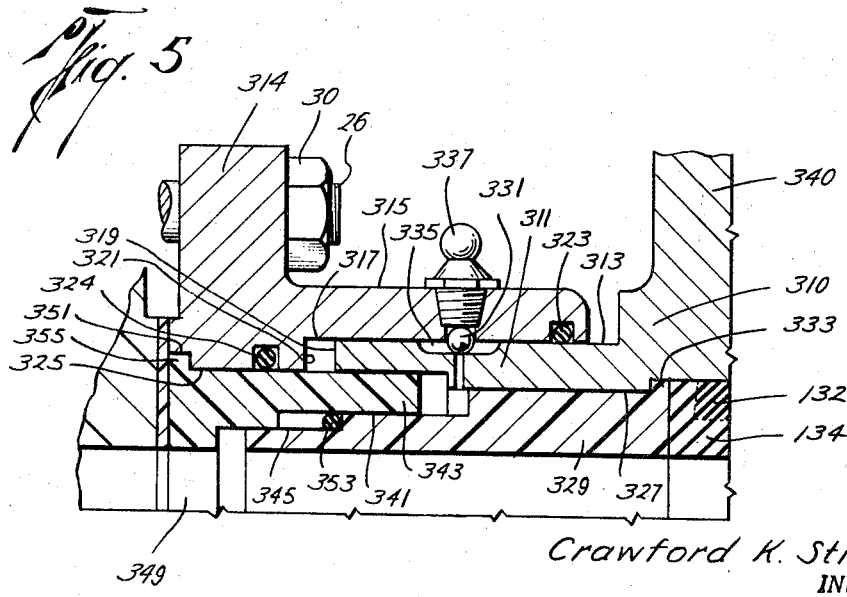
Crawford K. Stillwagon
INVENTOR.
BY Browning, Simmons,
Hyer & Eickenroht.
ATTORNEYS

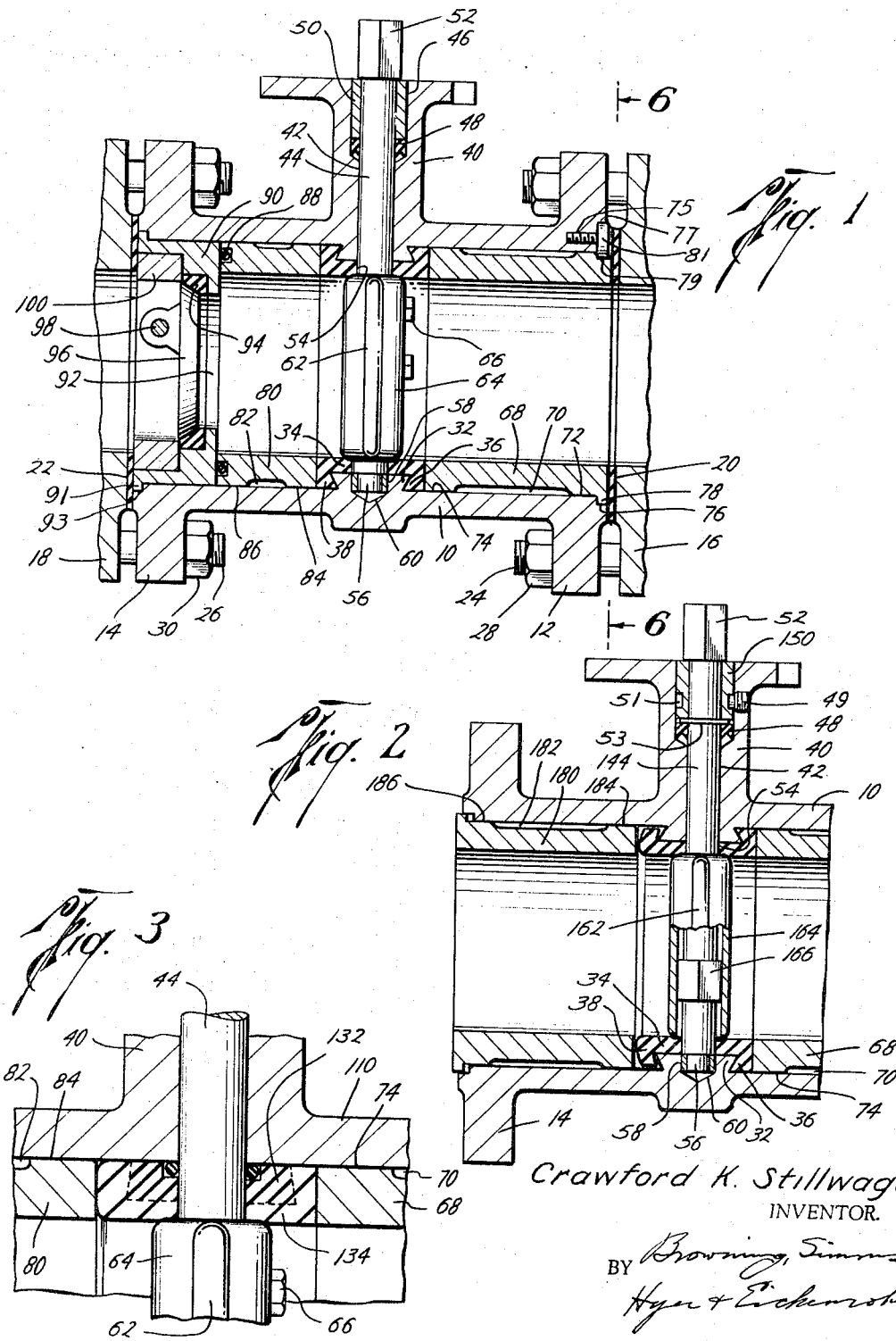

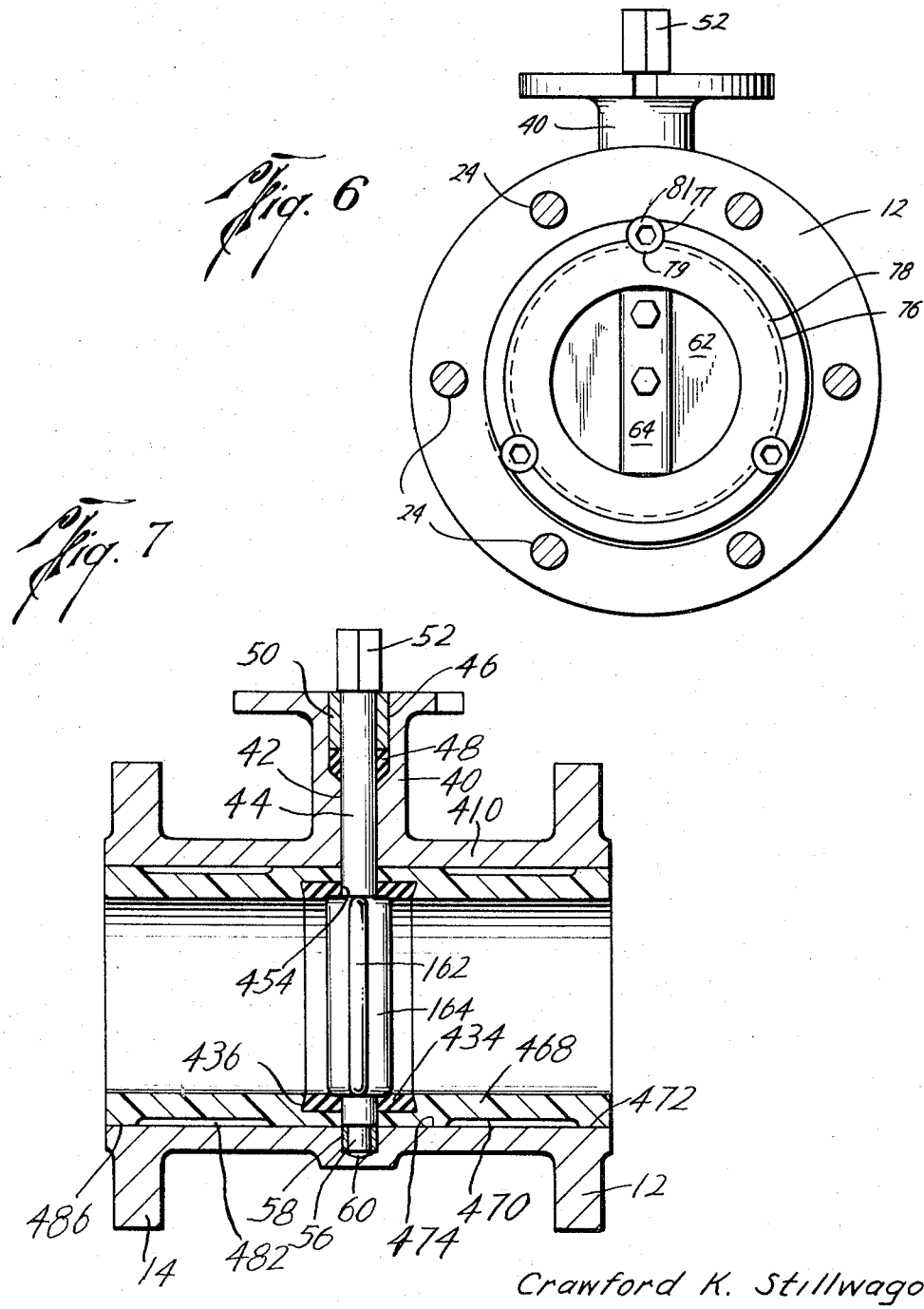

3,306,316
DISC VALVE AND FITTING
Crawford K. Stillwagon, Houston, Tex., assignor to Keystone Valve Corp., Houston, Tex., a corporation of Texas
Filed July 20, 1964, Ser. No. 383,812
3 Claims. (Cl. 137—375)

This invention relates to a disc valve and fitting adapted to be connected in a pipeline or system and occupy a space greater than that occupied normally by a disc valve, such as, for example, the space normally occupied by a gate or plug valve, without the necessity of the use of extra fittings or adapters to take up the excess space.

For many years gate and plug-type valves have enjoyed a preference by designers over disc-type valves in situations requiring the valves to shut off against pressures of more than a few pounds per square inch. In more recent years, however, disc-type valves have been developed as exemplified in U.S. Patents Nos. 2,740,423 and 2,994,342 which are capable of providing excellent shut-off against pressures much higher than formerly and in many cases in the range of 200 to 300 pounds per square inch. Such valves have had a number of characteristics making them more desirable in specific application as well as in general over the usual gate or plug valve designs, among these being the combination of low operating torque and quick opening and closing, lighter weight for given ratings, etc.

Nevertheless, in systems designed to employ gate or plug valves, disc valves of the character indicated have not been usable even as replacements without the use of supplementary adapter fittings because of their characteristically shorter axial dimension as compared with corresponding dimensions of plug and gate-type valves. In addition to requiring the handling of extra parts and substantially multiplying the work of installation required in installing both disc valves and adapters so that the combination thereof would occupy the space designed for a plug or gate valve, such a combination requires an extra joint requiring time and labor to make up and providing additional possibilities for leakage and the like, either initially or developing through operation.

Nor is it possible with the type of valve illustrated in the aforesaid patents merely to elongate the valve body and seat to make the over-all axial dimension great enough, because the type of valve seat used is made of soft resilient material and requires clamping by end flanges against a hard core to hold it in place. If extended to the ends of an elongated body and clamped in this fashion the anchoring would be too far from the part engaged by the disc to properly anchor such part. Furthermore, such a construction would require an excessive quantity of soft resilient material.

It is therefore an object of this invention to provide a disc-type valve of dimensions interchangeable with gate or plug valves without the use of adapters or excessively long resilient valve seats.

Another object is to provide such a valve capable of utilizing the type of valve seats disclosed in the aforesaid patents and discs cooperable therewith without loss of any of the advantages thereof.

Another object is the provision of such a disc valve or other fitting capable of being utilized in a space comparable to that designed to receive a gate or plug valve but not complying strictly with a predetermined standard dimension available along the line of flow for the reception of the disc valve or fitting, such disc valve or fitting being capable of adjustment of such dimension within limits of predetermined variations thereof.

Another object of this invention is to provide a disc valve of the character above mentioned which may have a body of standard structural material selected on the basis of strength and durability under external conditions to be encountered and with consideration to pressure differentials to be contained but without regard to resistance to deterioration under contact with materials to be handled.

Another object is to provide such valve as that last mentioned in which the structural material providing the body of the valve will be protected by a suitable readily removable and replaceable liner material providing the contact with the material being handled and protecting the body from contact therewith.

Another object of this invention is to provide valves of the character mentioned in which a single stock of valve bodies may be kept for use under standard size, pressure, and external exposure conditions without regard to the matter of possible deleterious effects thereon in the event of contact with material being handled.

Another object of this invention is to provide a valve of the character described in which the seats, discs and stems therefor may be of standard construction employed for disc valves of standard dimensions to which disc valves are customarily manufactured, yet which may be used to replace plug or gate valves of corresponding nominal diameters without the use of adapters.

Another object of this invention is to provide a valve body capable of replacing a standard gate or plug valve but utilizing standard dimension seat, disc and stem elements of disc valves, and which may be employed also for carrying check valves or the like in combination with a disc valve.

Another object is to provide a valve capable of replacing a standard gate or plug valve but having a one-piece valve liner and seat with the seat portion of soft resilient material and the liner and seat protecting the body from contact with the material being handled.

Other objects and advantages of this invention will become apparent from the following description taken in connection with the accompanying drawings, wherein are set forth by way of illustration and example, but not by way of limitation, several embodiments of this invention.

In the drawings:

FIG. 1 is a longitudinal sectional view taken along the plane of the center of the flow passageway and the axis of the disc valve stem of a valve constructed in accordance with this invention, showing the valve stem and disc in elevation in closed position, and showing in addition to the disc valve a check valve embodied in the same housing, the entire valve body and associated parts being mounted between flanges of a pipeline or system having a predetermined standard spacing greater than that normally required for disc valves;

FIG. 2 is a view similar to the left-hand portion of FIG. 1 but showing a slightly modified form of disc and stem engagement, omitting the showing of the check valve of FIG. 1, and showing the position of the valve liner in the left-hand end of the valve when the same has not been clamped in position against the valve seat by means of a connecting flange clamped against the end of the valve body;

FIG. 3 is a fragmentary view on a somewhat enlarged scale showing the central portion of the body surrounding the stem, the central portion of the valve seat surrounding the stem, the adjacent ends of two liner elements, and the adjacent portions of the disc and stem of a valve employing a seat construction in which the hard core on which the seat material is held is made integral with the seat material instead of integral with the body as in FIGS. 1 and 2;

FIG. 4 is a view similar to FIG. 1 but showing a modified form of valve in which one end of the valve body is made adjustable as to its dimension lengthwise of the path of flow therethrough so as to enable it to form a fitting to accommodate within limits variations in the space within which the valve or fitting is to be mounted;

FIG. 5 is a view on an enlarged scale similar to the left-hand portion of FIG. 4 but showing a modification in which the adjustment illustrated in FIG. 4 is present not only in the valve or fitting body, but in a liner within the adjustable portion of the body, so as to provide an adjustable valve body or similar fitting with a liner extending throughout its length of a material selected to resist a possible deleterious effect of the materials being handled;

FIG. 6 is a transverse section taken along the line 6—6 of FIG. 1 and showing the valve body in end elevation with a means of retaining the liner section within the body when a flange is not clamped thereagainst; and FIG. 7 is a view similar to FIG. 1 but showing a modification employing a one-piece liner and seat.

Referring now more in detail to the drawings, the valve body illustrated in FIG. 1 comprises an external structural member 10 of a material and dimensions calculated to fit a space much greater in dimension along the path of flow than normally required by a disc valve of the same nominal diameter, such as the space required for a disc or gate valve, and of sufficient wall thickness and the like to restrain the expected pressures and other conditions under which the valve is intended to operate. This valve body 10 is shown as having connecting flanges 12 and 14 at its opposite ends, these being of standard dimensions adapted to match the standard flanges 16 and 18 on the adjacent ends of the pipeline or system in which the valve is to be mounted. It will be understood that in joining the flanges 12 and 14 to the flanges 16 and 18, respectively, suitable gaskets 20 and 22 may be employed for providing seals therebetween, and that the flanges will be secured together in the usual fashion by means of studs 24 and 26 and nuts 28 and 30, respectively.

At a suitable point along the length of the valve body 10 and interiorly thereof, either at a central position as illustrated or at any other desired position along the length of the valve body 10, the same is provided in this form of the invention with an integral dovetail shape retaining core 32 of the same material as the body 10 for the purpose of receiving and retaining the valve seat 34 of resilient or elastomeric material. This valve seat 34 may be of standard construction, size and dimensions and actually interchangeable with valve seats customarily employed in the type of valves illustrated in the prior patents hereinbefore mentioned. In the instance illustrated this valve seat has radially outwardly extending flanges 36 and 38 embracing the dovetail core 32 at its opposite ends and when confined against the core 32 at the ends thereof being retained thereby against radially inward movement and held in operative position.

The valve body 10 is also provided with a stem receiving lateral extension 40 whose center is normally on a median transverse plane of the valve seat 34. This extension 40 has a bore 42 therethrough for receiving the valve stem 44, and adjacent its outer end is provided with a counterbore 46 to receive a seal 48 and a suitable gland or the like 50 to confine the seal 48.

The stem 44 has a portion 52 of noncircular cross section projecting externally therefrom by which the stem may be turned for the purpose of opening and closing the valve in a manner presently to appear.

The valve seat is provided with a pair of opposed openings on opposite sides as shown at 54 to permit the passage of the stem 44 therethrough. The stem 44 is adapted to extend entirely across the seat 34 and on its end opposite the noncircular projection 52 is provided with a bearing receiving portion 56 adapted to be received in a bearing sleeve 58 mounted in opening 60 in the valve body 10 positioned in alignment with the opening 42. Thereby the stem 44 is provided with a bearing support in the body 10 on both sides of the flow passageway therethrough.

Mounted on the stem within the flow passageway is a disc 62 of conventional construction employed in the manufacture of valves such as shown in the aforesaid United States patents, the same having a hub 64 surrounding the stem 44 and being secured thereto by means of cap screws 66 or other suitable means.

It will be appreciated that in the utilization of a valve seat of the character illustrated it is necessary that the same be clamped between flanges or other similar members in order that the outwardly extending flanges 36 and 38 of the valve seat may be securely held against the core 32. In the usual disc valve construction as illustrated in said patents, this clamping is accomplished by the securing of the flanges on adjacent ends of the pipeline or system against the flanges of the valve and incidentally against the flanges of the valve seat as described in said patents. However, this not being possible in the case of a valve body of elongated dimensions as illustrated, provision is made in this modification for transmitting the clamping effect from such flanges on the adjacent ends of the pipeline or system to the outwardly extending flanges or projections 36 and 38 of the valve seat by means of valve body liners such as the liner 68. This liner 68 preferably has a portion intermediate its ends of slightly smaller external diameter than the internal diameter of the body 10 as shown at 70, so that it will not require accurate machining and fitting throughout its length, but bears at zones adjacent its opposite ends against the internal surface of the body as illustrated at 72 and 74, respectively. This fit is made reasonably snug so that the valve liner 68 will not be subject to lost motion laterally between it and the valve body 10.

Adjacent its outer end the bore through the outer body member 10 is counterbored to a slightly larger diameter as indicated at 76 so as to receive a small radially extending flange or bead 78, the engagement of this bead in the counterbore 76 serving to limit the extent to which the liner element 68 may be forced into the outer body member 10. This in turn will limit the extent to which this liner member may clamp the flange 36 of the valve seat 34 against the dovetail retaining core 32 of the body member 10 and prevent damage to and extrusion of the valve seat. The liner may be secured in place in the body so that it will not accidentally be dislodged when the valve is not mounted between flanges. This may be done by tapping holes 75 in the body adjacent the counterbore 76 and forming registering counterbore segments 77 and 79 in the body end and flange 78 concentric with each hole 75 to receive retaining screws with countersunk heads 81 to hold the liner in place. Any suitable number of such screws may be used.

Both ends of the valve body may be provided with liners which, when merely inserted until in contact with the valve seat without compressing the same, extend from the end of the valve body a distance sufficient to clamp the appropriate flange of the valve seat in place against the dovetail core 32, as shown in the right-hand end of FIG. 1. However, in FIG. 1 the left-hand portion of the structure illustrated is provided with a shorter liner element 80, similar to the liner element 68 except (a) in length, (b) in the omission of a stop flange or bead such as 78, and (c) in the provision of a seal at its end remote from the valve seat for a purpose presently to be noted. Like the liner 68, this liner 80 is provided with an intermediate portion 82 of slightly smaller external diameter than the internal diameter of the adjacent body member 10, and adjacent its ends with portions accurately formed at 84 and 86 to snugly fit within the body member 10.

In its end most remote from the valve seat 34, the liner 80 is provided with a groove carrying a suitable seal such as an O-ring 88. The length of the liner member 80 is so selected that when in place it will leave a sufficient space between its end which carries the seal 88 and the end of the body member 10 of a size to receive a check valve body 90. This check valve body 90 is provided with one surface adapted to seat and seal against the seal 88 in the end of the liner 80, with an outer diameter adapted to fit snugly within the body member 10, and with an outwardly extending bead or flange 91 adapted to seat in a counterbore 93 similar to the counterbore 76 and limit the extent to which the body member 90 may be pushed into the body member 10 to compress the flange 38 of the seat 34.

The check valve body 90 has an inwardly extending flange 92 providing a shoulder for receiving a check valve seat 94. The seat 94 in turn in formed to sealingly receive the check valve disc 96 which is pivoted at 98 in suitable fashion to the retaining and supporting ring 100. The ring 100 is in turn forced into a counterbore in the end portion of the check valve body 90 to complete the check valve structure.

It will readily be seen that the structure illustrated in FIG. 1 will provide a disc valve that can be made of any dimension required to replace a gate or plug valve or any other element whose dimension from intake to outlet is known but greater than that for which disc valves of the same nominal diameter are provided, and greater than that for which disc valves of the type disclosed in the aforesaid patents can readily be provided. It will further be seen that the same housing may be made to support not only a disc valve, but to carry a check valve without any increase in dimension, and that all of the functions of the disc valve, including the adequate clamping in place of the removable valve seat, may be accomplished in this structure with substantially the same effect as in the normally sized disc valve illustrated in the aforementioned United States patents.

In FIG. 2 the left-hand portion of a similar valve is illustrated with certain differences from the structure illustrated in FIG. 1.

In FIG. 2, for example, the gland 150 corresponding to the gland 50 of FIG. 1 is shown being retained in place by means of a set screw 49 engaging an external groove 51 in the outer surface of the gland 150. In turn, the stem 144 is provided with an external groove to receive a split ring 53 which bears against the inner end of the gland 150 and the stem is held in place thereby.

In the engagement between the stem 144 and the hub 164 of the disc 162 there is also a slight difference in that the interior of this disc is provided with a noncircular cross section adapted to receive a similarly shaped cross section portion 166 of the stem 144. This arrangement makes it possible to remove the stem merely by loosening the set screw 49 and pulling the stem out. The noncircular engagement between the stem portion 166 and the disc hub 164 is made of maximum size such that the stem can be removed through the opening 42. Thereupon the disc 162 will be free for removal through the end of the valve body. This construction eliminates the use of means such as cap screws 66 and provides an unbroken outer surface of the disc member exposed to the materials being handled.

In this figure also the liner member 180 is shown identical in construction with the liner member 68 of FIG. 1 and has an intermediate outer diameter portion 182 of a lesser dimension than the internal diameter of the valve body 10 at the same portion of its length. Likewise, adjacent its ends the liner has portions 184 and 186 accurately dimensioned to fit snugly within the body member 10 and position the liner 180 therein.

Unlike FIG. 1, the liner 180 is shown in the position it occupies when not clamped tightly against the seat 34 by being secured against an adjacent flange of a pipeline or piping system. It is noted that in this position the end of the liner member 180 projects slightly beyond the end of the valve body member 10, and leaves the flange 38 of the seat 34 in its initial undistorted shape which is substantially similar to that shown in the initially undistorted shape of corresponding portions of the seats in FIG. 4 of U.S. Patent No. 2,994,342. The left and right portions of this FIG. 2 thus illustrate the unclamped and undistorted shape on the one hand and the clamped and somewhat distorted shape on the other hand of the flanges of the valve seat.

In FIG. 3 is illustrated a modification, the parts in this fragmentary illustration being similar to those in FIG. 1 except that the body 110 does not have the integral core 32 but instead is of uniform internal diameter throughout its length. On the other hand, the seat 134 is similar to the seat 34 except that it has molded integrally with it a core portion 132 preferably formed of a material harder and more rigid than that of the valve seat portion against which the disc seats. Thus there is formed a composite valve seat which incorporates as an integral part thereof the harder and more rigid core 132 and this entire composite valve seat may be slipped in endwise of the valve body without necessity for working it over a part integral with the valve body such as the integral core 32 of FIG. 1. It is noted that the left-hand liner member 80 illustrated in FIG. 3 is shown before being pushed tightly against the seat 134 thus leaving the left-hand end of this seat in FIG. 3 uncompressed as compared with the right-hand end. It will be understood that when a valve constructed in accordance with this figure is clamped between flanges in an appropriate position within a pipeline or piping system the positions of both ends of the seat 134 will be as appear at the right-hand portion of this figure.

It will be apparent that when the valve is constructed with a full liner in both ends as illustrated in the right-hand end of FIG. 1 and the left-hand end of FIG. 2, whether with the valve seat illustrated in FIGS. 1 and 2 or with that illustrated in FIG. 3, the two liner sections and the valve seat will form a complete lining for the inside of the valve body member 10 or 110 as the case may be, and will prevent contact with such body member of the materials being handled. Thus, a body member may be constructed of steel, cast iron or such other materials and in such dimensions as necessary to stand the stresses to which it will be subjected and to stand up under the outside environment in which the valve is to be employed but need not be constructed to withstand the effects of contact with the material being handled. Instead, a standard stock of such valve bodies may be employed no matter what the nature of the material being handled, and the valve liner sections and valve seat may be made of material such as stainless steel, bronze, or plastic such as polymerized tetrafluoroethylene, selected to withstand the action of the material being handled. Furthermore, even in the case of the combination with a check valve or similar device as illustrated in FIG. 1, the body of such check valve device and the parts exposed to the interior through which the material being handled will flow, may be made of a material to withstand any deleterious action of the material being handled and the valve body member 10 may still be made of a material suitable for structural purposes without regard to the nature of the material being handled.

For use in those cases in which the space available for installation of a valve of the character to which this invention relates is found to vary from a standard dimension, an adjustable valve body or other fitting may be provided as illustrated in FIGS. 4 and 5.

In FIG. 4 the valve body member 210 in its right-hand portion is shown as being identical with that illustrated in FIG. 3 and it will be unnecessary to redescribe the same. However, instead of the valve body being of uniform diameter throughout, the left-hand end portion is made of two parts telescoping with one another, leaving a shoulder 133 at the position occupied by the left-hand end of the valve seat 134 against which such valve seat will be abutted after being slipped into the right-hand end of the valve body member 210. The valve seat and liner 68 will be so sized that when the liner is forced inwardly until its end is flush with the end of the valve body member 210, the valve seat will be duly clamped in position and held against the shoulder within the valve body member 210.

As indicated, the left-hand portion of the body member 210 is provided in FIG. 4 with an extension 211 having an internal diameter substantially the same as that of the valve seat 134 and the valve liner 68, and its portion adjacent the valve seat has an external diameter indicated at 213 somewhat less than the external diameter of the right-hand portion of the body member 210. The second portion of the two-part telescoping left end of the valve body member shown in FIG. 4 is a part 215 with one portion of an internal diameter to fit over the external diameter portion 213 and another part of lesser internal diameter adapted to fit over the external diameter portion 217 of the body part 211. In between the external diameter portions 213 and 217 is an outwardly facing shoulder 219 on the part 211 adapted to receive and form a stop for the shoulder 221 internally of the part 215. One seal between these telescoping parts is provided by a suitable seal element such as the O-ring 223 mounted in a groove in the inner end of the part 215.

The outer end of the part 215 adjacent and within the flange 214 has an inwardly extending flange 225 with an inner diameter substantially the same as that of the liner element 68, the valve seat 134, and the body part 211.

The body part 211 is preferably provided with a portion of reduced outer diameter adjacent its end, so as to receive a pressure energized seal such as an O-ring 227 and a filler ring 229 to provide an additional seal between the two body members 211 and 215 spaced from the first seal 223. Also between these two seals the body member 215 is provided with an internal row of ball bearings 231 restrained within a bearing groove 233, and projecting from the member 215 into a wide bearing groove 235 in the member 211. By virtue of the width of the wide bearing groove 235 the parts 211 and 215 may move longitudinally one relative to the other but their movement will be limited by the width of the wide bearing groove 235, the ends of which will provide a stop limiting such movement, when the balls 231 are in place.

The body member 215 is preferably provided with a pressure-type grease fitting 237 of the usual type having a check valve therein to prevent reverse flow therethrough. By injection of grease or other fluid under pressure through this fitting 237 opposite pressures will be exerted on the two members 211 and 215 causing the one to be extended relative to the other. By this means, if the space between the flanges 16 and 18 of the pipeline or system into which the subject valve is to be connected be greater than the dimension of this valve when the telescoping body members 211 and 215 are in their position of greatest engagement with each other, then the injection of pressure through the fitting 237 after the body member has been inserted between the flanges 16 and 18 will cause the two body members to separate relative to one another and take up any slack such as indicated by the numeral 239 in FIG. 4, thereby completely filling the space between the flanges 16 and 18.

It will be noted that although the arrangement in FIG. 4 provides for the adjustment of the over-all dimension of the body or fitting to accommodate deviations of standard dimension between the flanges 16 and 18, the body portion 211 thereof does not provide for any liner such as the liner 68 whereby it might be protected from the deleterious effect of fluids being handled. In order to provide an adjustable fitting of this character in which such protection may be had, the structure illustrated in FIG. 5 has been devised. In this structure the body member 310 has a portion 311 somewhat similar to portion 211 of FIG. 4 in that it has an outer diameter 313 adapted to receive and fit with the inner diameter of the other body member 315 which is illustrated. The body member 315 has a portion 317 with an internal diameter fitting with the outer diameter 313 of the body member 310. The end of the body member 310 provides a shoulder 319 which is opposed to a shoulder 321 within the body member 315 and outwardly of this shoulder 321 the body member 315 is of the same internal diameter as the outer portion of the body member 310.

For the purpose of providing a seal between these two body members, the body member 315 is provided with an internal groove having therein a suitable seal such as an O-ring 323, the same being also in engagement with the outer surface 313 of the body member 310. Another O-ring 324 is provided in a groove in the interior of the body member 315, this one being in engagement with an inner liner member presently to be described. This inner liner member is of an outer diameter adapted to fit within the smaller portion 325 of the bore through the body member 315 and to have sealing engagement with the O-ring 324 just described. The interior of the body member 311 also has a minimum diameter 327 adapted to receive a liner member 329. This member is of slightly smaller of the body member 310 which receives the seat 134. as is also the portion 327 of the body member 311 of slightly smaller diameter than the diameter of the portion of the body member 310 which receives the seat 134. However, the liner member 329 has on its end adjacent the seat 134 an outwardly projecting flange or bead 333 by which it is held against longitudinal movement with respect to the body member 311.

Interposed between body members 311 and 315 is a row of ball bearings 311 fitting wthin a bearing groove in the body member 315 and in a wide bearing groove 335 within the body member 311. As in the case of FIG. 4, this arrangement permits a limited movement in a telescoping direction between the two body members 311 and 315 and limits the extent of such movement. Also, as in FIG. 4, a pressure fitting 337 is provided whereby lubricant or other fluid under pressure may be injected into the space between the two body members so as to force them apart when desired.

That portion of the liner member 329 which is opposite from the flange 333, has a smaller outer diameter as shown at 341 fitting within a portion of similar internal diameter in a liner member 343. Beyond the portion 341 is still a further portion of reduced outer diameter 345 adapted to fit within a reduced inner diameter portion of the liner member 343 so as to provide between them a space suitable for receiving a seal in the form of an O-ring or the like 353. This liner member 343 has on its outer end an outwardly projecting flange or bead 355 fitting within a counterbore 351 in the body member 315 so as to limit the inward movement of the liner member 343 relative to the body member 315 and insure that when the body member 315 moves outwardly under the influence of pressure fluid injected through the fitting 337, the liner member 343 will move with it. The liner member 343 has an end portion located beyond the end of liner member 329 which is of the same inner diameter as the liner member 329 as shown at 349.

It will be seen that the structure just described and illustrated in FIG. 5 will operate in substantially the same manner as that shown in FIG. 4 to provide an adjustment enabling it to fit any variations of space within the limits of the structure, and in addition to the functions provided by the structure shown in FIG. 4, the structure shown in FIG. 5 provides for a complete lining of the interior of the body member so that the latter may be made of a metal suitable for structural purposes and protected from the fluid being handled by a liner of material suitable for such protective purposes.

In FIG. 7 there is shown an embodiment of the invention in which a liner for the valve body is made in one piece with the valve seat incorporated therein so that there will not be necessity for one assembling such a valve liner and seat element with the valve body to handle three pieces of equipment as in FIGS. 2 and 3, for example, and in which there will not be joints offering possible opportunity for leakage or the like between the liner members and the seat.

In this FIG. 7 the valve body 410 is substantially identical with the valve body 110 in FIG. 3 except for the fact that the ends of the body 410 in FIG. 7 are not counterbored to receive flanges on the ends of the liner members as the ends of the body 110 in FIG. 3 might be. The stem receiving part 40 of the body 410 and the parts associated therewith are substantially identical with the parts bearing corresponding numbers in FIG. 1 and need not be further described. The same is true of the disc and hub 162 and 164 which are substantially identical with the disc and hub bearing corresponding numbers in FIG. 2. Likewise the parts of the body providing a bearing for the roller and of the stem 44 in FIG. 7 are substantially identical with the corresponding parts in FIGS. 1 and 4 and need not be again described.

However, in FIG. 7, instead of having a valve seat as a separate unit located centrally within the valve body, a valve seat 434 of relatively soft resilient material is provided and is mounted by means such as a groove of dovetail shape 436, or by other suitable means, intermediate the ends of the one-piece liner 468. The inner diameter of this seat 434 is, as in previously described modifications, of such size as to receive and provide sealing interference with the disc 162. Its outer diameter is less than the inner diameter of the body 410 so that the liner 468 may extend throughout the length of the body 410 and have its ends substantially flush with the ends of the body 410, projecting beyond the ends of the body only slightly, if at all. The only purpose of any projection beyond the ends of the body would be to insure adequate sealing pressure against gaskets such as the gaskets 20 and 22 of FIG. 1.

The one-piece liner 468 preferably has portions of its length 470 of smaller outside diameter than the inside diameter of the body 410 so as to be slightly spaced therefrom when assembled, and has parts adjacent its ends and intermediate its ends as shown at 472, 474 and 486, which are accurately formed to snugly fit within the body and accurately position the liner within the body.

It will be understood that the seat 434 and the liner 468 will have openings 454 therethrough for the passage of the stem 44 and that these openings will be of such size as to provide a sealing fit around the stem 44.

The seat 434 may if desired be bonded to the material of the liner 468 in any desired well-konwn fashion if such bonding be found desirable.

In the form just described a person assembling the body 410 with the remainder of the valve elements need handle only one element in putting the seat and liner in place, and once the seat and liner are in place and the valve stem and disc inserted, the seat and liner require no further means for securing them within the body. Neither will these parts present any opportunity for leakage between the stem and liner and leakage past the ends thereof from the flow passage through the interior of the valve liner will be prevented by the gaskets employed in sealing the ends of the valve body to the adjacent flanged connections of the pipeline or system in which the valve is to be mounted.

From the foregoing it will be seen that this invention is one well adapted to attain all of the ends and objects hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve and fitting comprising a body, a resilient rubber-like annular valve seat in said body as a separate item therefrom and a disc-type closure and stem combination mounted in said seat and body, said body having a flow passageway therethrough and being of a length along said passageway equal to a predetermined space in a pipeline and greater than the length of said seat, means on said body at each end of the flow passageway adapted for use in coupling said body ends to adjacent connections on a pipeline, said body having an intermediate portion of an inner dimension great enough to receive said valve seat and said seat being disposed in said intermediate portion, said seat and body having aligned openings therein transversely of said flow passageway and of a size to receive said stem, said stem extending through said openings from the exterior of said body to the interior of said seat and said disc being mounted thereon within said seat and rotatable with said stem between a closed position transversely of said flow passageway and an open position with its major dimension in substantial alignment with said flow passageway, and a pair of means in said body abutting opposite end portions of said seat, one of said seat abutting means being movable toward the other to clamp said seat between them, said seat abutting means comprising body liners lining said body and in sealing engagement with and extending from each end of said seat to and having the ends remote from said seat flush with the respective ends of said body when said seat is fully clamped endwise between said seat abutting means in its operative position within said body.

2. A valve and fitting in accordance with claim 1 in which said one of said means abutting said seat includes a separate annular means slidably fitting within said body and is of an aggregate length equal to the distance from the adjacent end of said seat to the adjacent end of said body when said seat is fully clamped endwise and said last-mentioned annular means has an inner annular valve seating surface and there is a disc-type check valve element pivotally mounted in said last-mentioned annular means on an axis offset from the plane of said valve seat and from the central axis of said valve seat and disposed transverse to said central axis.

3. A valve and fitting comprising a body, a resilient rubber-like annular valve seat in said body as a separate item therefrom and a disc-type closure and stem combination mounted in said seat and body, said body having a flow passageway therethrough and being of a length along said passageway equal to a predetermined space in a pipeline and greater than the length of said seat, means on said body at each end of the flow passageway adapted for use in coupling said body ends to adjacent connections on a pipeline, said body having an intermediate portion of an inner dimension great enough to receive said valve seat and said seat being disposed in said intermediate portion, said seat and body having aligned openings therein transversely of said flow passageway and of a size to receive said stem, said stem extending through said openings from the exterior of said body to the interior of said seat and said disc being mounted thereon within said seat and rotatable with said stem between a closed position transversely of said flow passageway and an open position with its major dimension in substantial alignment with said flow passageway, and means in said body extending from said seat to the end of said body to provide a liner therefor and to retain said seat in position in said body said last-mentioned means being a unitary liner slidably fitting within said body and of a length equal to the distance from end to end of said body, and said seat is carried on the inner surface of said liner.

References Cited by the Examiner

UNITED STATES PATENTS

| | | | |
|---|---|---|---|
| 2,856,952 | 10/1958 | Stillwagon | 251—306 XR |
| 2,936,153 | 5/1960 | Gaffin | 251—306 |
| 3,016,914 | 1/1962 | Keithahn | 137—454.2 XR |
| 3,026,899 | 3/1962 | Mischanski | 137—375 |
| 3,096,071 | 7/1963 | Fisher | 251—306 |

FOREIGN PATENTS 828,929  2/1960  Great Britain.

M. CARY NELSON, *Primary Examiner.*

HENRY T. KLINKSIEK, *Assistant Examiner.*